(12) United States Patent
Roll

(10) Patent No.: US 9,309,873 B2
(45) Date of Patent: Apr. 12, 2016

(54) GASKETLESS HIGH PRESSURE CONNECTION

(71) Applicant: KMT Waterjet Systems Inc., Baxter Springs, KS (US)

(72) Inventor: Eric D. Roll, Joplin, MO (US)

(73) Assignee: KMT Waterjet Systems Inc., Baxter Springs, KS (US)

( * ) Notice: Subject to any disclaimer, the term of this patent is extended or adjusted under 35 U.S.C. 154(b) by 607 days.

(21) Appl. No.: 13/647,981

(22) Filed: Oct. 9, 2012

(65) Prior Publication Data

US 2013/0087039 A1   Apr. 11, 2013

Related U.S. Application Data

(60) Provisional application No. 61/545,236, filed on Oct. 10, 2011.

(51) Int. Cl.
*F16L 35/00* (2006.01)
*F04B 19/22* (2006.01)
*F04B 37/12* (2006.01)
*F04B 53/14* (2006.01)
*F16J 15/04* (2006.01)

(52) U.S. Cl.
CPC .............. *F04B 19/22* (2013.01); *F04B 37/12* (2013.01); *F04B 53/143* (2013.01); *F16J 15/04* (2013.01)

(58) Field of Classification Search
CPC ......... F16L 25/00; F16L 55/136; F16L 17/08; F04B 19/22; F04B 37/12; F04B 53/143; F16J 15/04

USPC ........................................................... 92/164
See application file for complete search history.

(56) References Cited

U.S. PATENT DOCUMENTS 1,722,623 A   7/1929   Bramwell
2,258,066 A   1/1941   Oyen
(Continued)

OTHER PUBLICATIONS

American Society of Mechanical Engineers Boiler and Pressure Vessel Code, Section VIII, Division 3, "Alternative Rules for Construction of High Pressure Vessels," a printed publication published by the American Society of Mechanical Engineers, copyright 1998, 2000, Part KG and Nonmandatory Appendix H, pp. 1-17 and 323-327.

(Continued)

*Primary Examiner* — Nathaniel Wiehe
*Assistant Examiner* — Dustin T Nguyen
(74) *Attorney, Agent, or Firm* — Michael Best & Friedrich LLP

(57) ABSTRACT

A sealing system for a high pressure pump, in which the pump includes a vessel defining a vessel bore and having an end portion, the vessel bore having a first engagement face and defining a central longitudinal axis, and in which the pump further includes a plunger cooperative with the vessel to increase the pressure of a fluid within the bore, includes a seal member at least partially received within the bore and defining a second engagement face. The sealing system further includes a retaining member in operative contact with the seal member to mate the first engagement face with the second engagement face to inhibit fluid leakage from the bore. The first engagement face includes a first contacting surface having a non-linear cross-section. The second engagement face includes a second contacting surface having a non-linear cross-section in contact with the first contacting surface.

17 Claims, 8 Drawing Sheets

(56) References Cited

U.S. PATENT DOCUMENTS

| | | | | |
|---|---|---|---|---|
| 3,429,581 A | | 2/1969 | Himmel | |
| 3,752,509 A | * | 8/1973 | Stafford | 285/334.4 |
| 4,181,332 A | | 1/1980 | Neumann | |
| 4,817,962 A | | 4/1989 | Mott et al. | |
| 4,836,455 A | | 6/1989 | Munoz | |
| 5,002,316 A | | 3/1991 | Chohan | |
| 5,054,691 A | | 10/1991 | Huang et al. | |
| 5,120,084 A | | 6/1992 | Hashimoto | |
| 5,143,410 A | | 9/1992 | Takikawa | |
| 5,172,939 A | | 12/1992 | Hashimoto | |
| 5,350,200 A | | 9/1994 | Peterson et al. | |
| 5,489,127 A | | 2/1996 | Anglin et al. | |
| 5,667,255 A | | 9/1997 | Kato | |
| 5,725,259 A | | 3/1998 | Dials | |
| 6,045,162 A | | 4/2000 | Haibara | |
| 6,045,165 A | | 4/2000 | Sugino et al. | |
| 6,086,070 A | | 7/2000 | Tremoulet, Jr. et al. | |
| 6,092,743 A | | 7/2000 | Shibata et al. | |
| 6,161,774 A | | 12/2000 | Ricco | |
| 6,279,965 B1 | | 8/2001 | Kida | |
| 6,312,022 B1 | * | 11/2001 | Brophy et al. | 285/268 |
| 6,802,541 B2 | * | 10/2004 | Hopinks et al. | 285/334.4 |
| 7,066,496 B2 | | 6/2006 | Williams et al. | |
| 7,367,789 B2 | * | 5/2008 | Raghavan et al. | 417/571 |
| 7,393,018 B2 | | 7/2008 | Williams | |
| 2003/0122376 A1 | | 7/2003 | Hopkins et al. | |
| 2005/0074350 A1 | | 4/2005 | Raghavan et al. | |
| 2008/0019851 A1 | * | 1/2008 | Hopkins et al. | 417/415 |
| 2010/0001472 A1 | * | 1/2010 | Wheeler | 277/314 |

OTHER PUBLICATIONS

Supplementary European Search Report for Application No. EP 12 83 9952 dated Oct. 22, 2015 (7 pages).

* cited by examiner even if citing US 9,309,873 B2

GASKETLESS HIGH PRESSURE CONNECTION

RELATED APPLICATION DATA

The present application claims priority under 35 U.S.C. §119 to Provisional Patent Application No. 61/545,236, filed Oct. 10, 2011, the disclosure of which is hereby incorporated by reference.

BACKGROUND

The present invention relates to a gasketless high pressure connection for an ultrahigh pressure fluid pump.

Precision cutting for industrial and commercial purposes is often accomplished through the use of a waterjet system that directs a high speed stream of water at a material surface to be cut. Waterjet systems pressurize water to about 30,000 psi and convert that pressure to a fluid stream traveling at speeds in excess of Mach 2. This high velocity stream, often mixed with an abrasive, is capable of slicing through hard materials such as metal and granite with thicknesses of more than a foot.

SUMMARY

The pumps operating within a waterjet system require sealing connections able to contain the high pressures generated. Seal gaskets positioned between the sealing surfaces in such an environment are typically constructed of a softer material than that of the surrounding components and tend to rapidly break down, requiring frequent replacement. A sealing assembly for these purposes should therefore effectively seal the high pressure side from a low pressure side without premature failure or necessitating unreasonable maintenance.

In one embodiment of a sealing system for a high pressure pump, the pump includes a vessel defining a vessel bore and having an end portion. The vessel bore has a first engagement face and defines a central longitudinal axis. The pump further includes a plunger cooperative with the vessel to increase the pressure of a fluid within the bore. The sealing system includes a seal member at least partially received within the bore and defining a second engagement face, and a retaining member in operative contact with the seal member to mate the first engagement face with the second engagement face to inhibit fluid leakage from the bore. The first engagement face includes a first contacting surface having a non-linear cross-section. The second engagement face includes a second contacting surface having a non-linear cross-section in contact with the first contacting surface.

A high pressure pumping system for fluid in excess of 15,000 psi defines a longitudinal axis. A first component includes a first engagement face having a first contacting surface with a first non-linear cross-section that is convex. A second component includes a second engagement face having a second contacting surface with a second non-linear cross section that is concave. A retaining member is coupled to one of the first component and the second component to sealingly connect the first engagement face to the second engagement face to inhibit fluid leakage therebetween.

A high pressure pump for producing fluid pressure in excess of 15,000 psi includes a vessel including an end portion having a first engagement face. The vessel includes a vessel bore that defines a central longitudinal axis and is in communication with a source of fluid. A plunger is cooperative with the vessel to increase the pressure of a fluid within the bore. A seal member is at least partially received within the bore and defines a second engagement face. A retaining member is in operative contact with the seal member and with the vessel to mate the first engagement face with the second engagement face to inhibit fluid leakage from the bore. The first engagement face includes a convex contacting surface with a variable radius continuously increasing with increasing distance from the longitudinal axis.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. And as used herein and in the appended claims, the terms "upper", "lower", "top", "bottom", "front", "back", and other directional terms are not intended to require any particular orientation, but are instead used for purposes of description only.

It should be noted that "ultrahigh" or 'high pressure" as used herein refers to fluid pressure in excess of 15,000 psi. One of ordinary skill in the art will realize that unique problems occur at these high pressures. Thus, solutions common to lower pressure pumps are not necessarily applicable to systems operating at pressures in excess of 30,000 psi and in fact can produce results contrary to those seen in low pressure operation.

Figure 1:
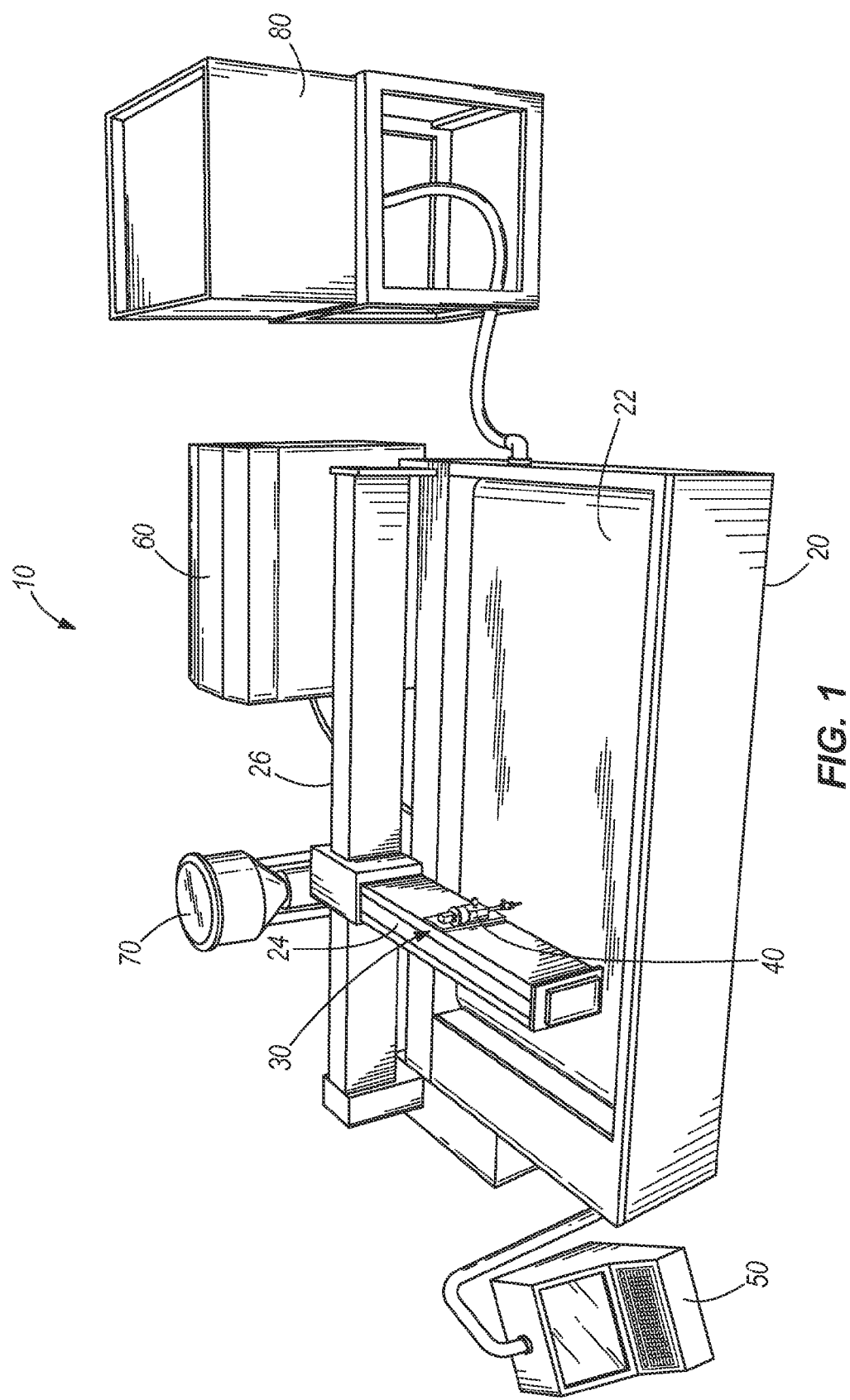
FIG. 1 is a perspective view showing an abrasive waterjet cutting system.

FIG. 1 illustrates an abrasive waterjet cutting system 10 for cutting a particular material with a high pressure stream of water mixed with abrasive. The cutting system 10 includes a cutting table 20 with a material supporting surface 22 and a cutting head assembly 30 that includes a cutting head 40. The cutting head assembly 30 is controlled through a computer 50 and is functionally movable via the arms 24, 26 in a manner known to those of skill in the art to provide cutting at any required operable location on the surface 22. A pumping system 60 generates high pressure fluid, typically water, for the cutting process and provides that water through a high pressure tube (not shown) to the cutting head assembly 30. A feed system 70 supplies an abrasive material, such as garnet, that is combined with the water stream at the cutting head 40. An abrasive removal system 80 filters the wastewater produced in the process to recover the abrasive for further use. The wastewater can be disposed of through a drain or recycled to minimize overall water usage.

Figure 2:
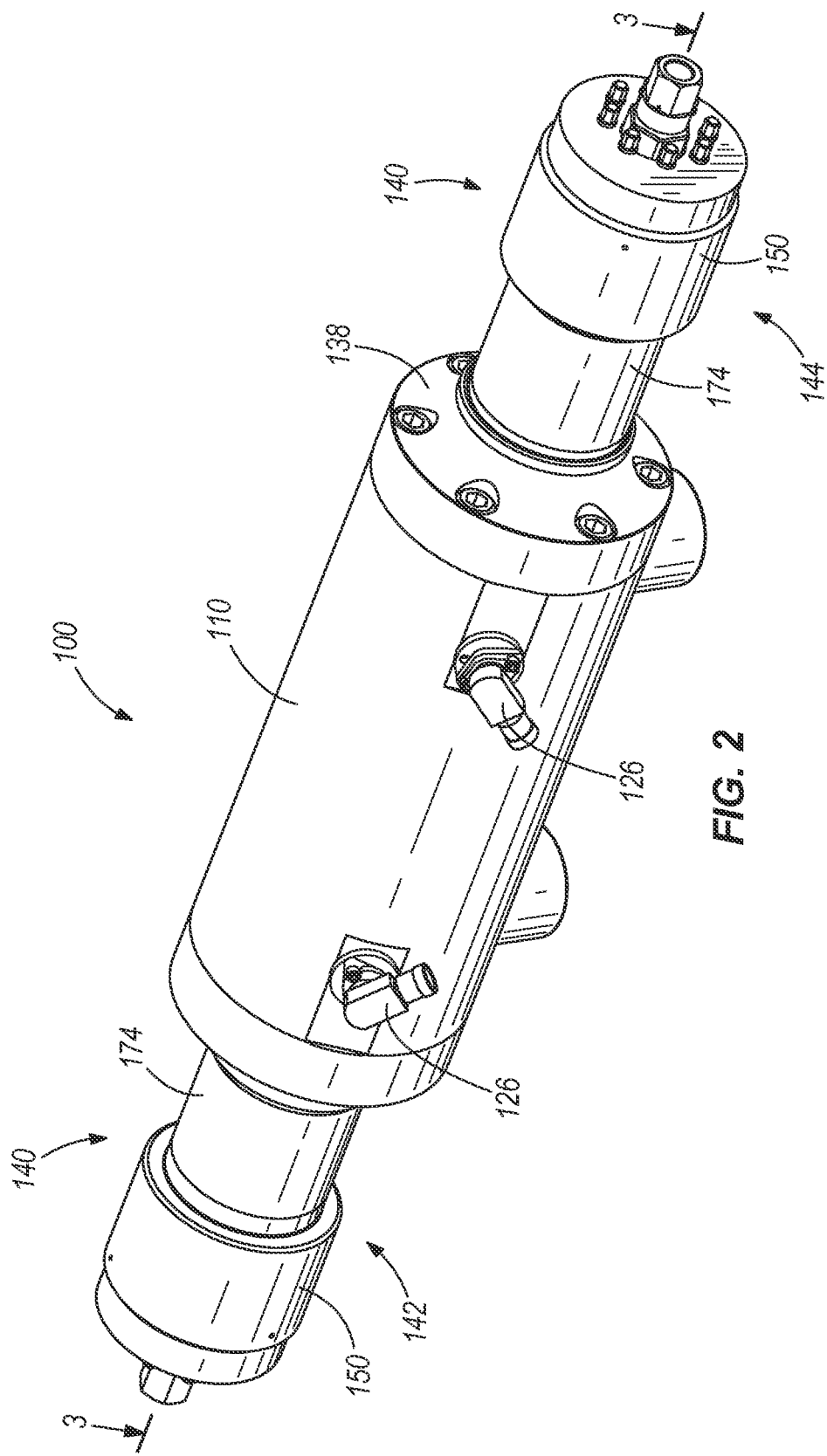
FIG. 2 is a perspective view of the intensifier pump of the abrasive waterjet cutting system of FIG. 1.
Figure 3:
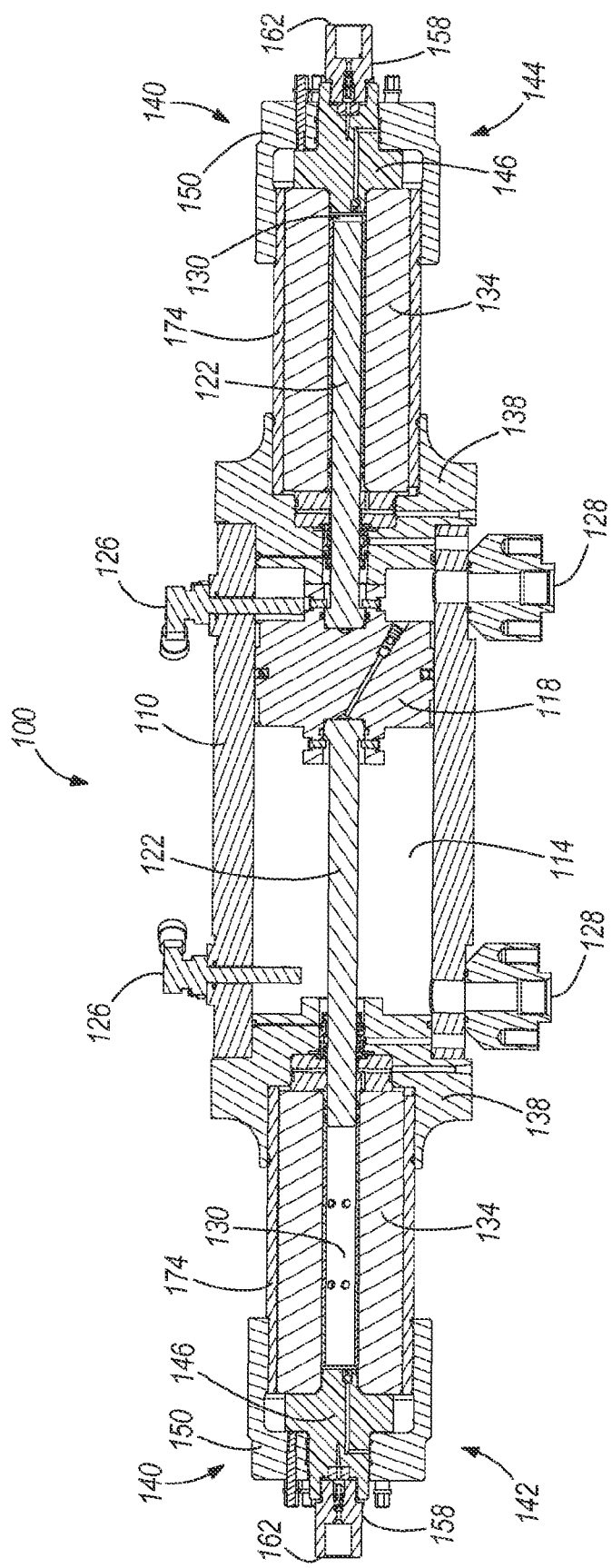
FIG. 3 is a cross sectional view of the intensifier pump of FIG. 2 taken along line 3-3.

FIGS. 2 and 3 illustrate a double acting high pressure pump 100 of the pumping system 60. As is well known to those of skill in the art, this type of pump, also referred to as an intensifier pump, includes a power cylinder 110 defining a hydraulic fluid chamber 114. A double-sided piston 118 coupled to opposing plungers 122 alternates back and forth within the chamber 114 in response to pressurized hydraulic fluid directed into and out of the chamber 114. One or more proximity switches 126 detect the piston 118, and when detected, send a signal to a controller such as a PLC to switch a 4-way valve on the hydraulic pump, thus directing hydraulic oil to the other side of the piston 118 through the ports 128 at the bottom of the power cylinder 110. The piston/plunger assembly acts as a pressure multiplier to increase the pressure of a fluid, such as water, drawn into the bores 130 of two opposing cylindrical vessels 134. The vessels 134 are coupled to the power cylinder 110 through hydraulic cylinder heads 138. A pump head 140 is disposed on the ends 142, 144 of each cylindrical vessel 134. The pump head 140 includes a seal head 146 partially disposed inside an end cap 150. Each end 142, 144 is substantially identical and capable of delivering high pressure fluid to the waterjet cutting system.

Figure 4:
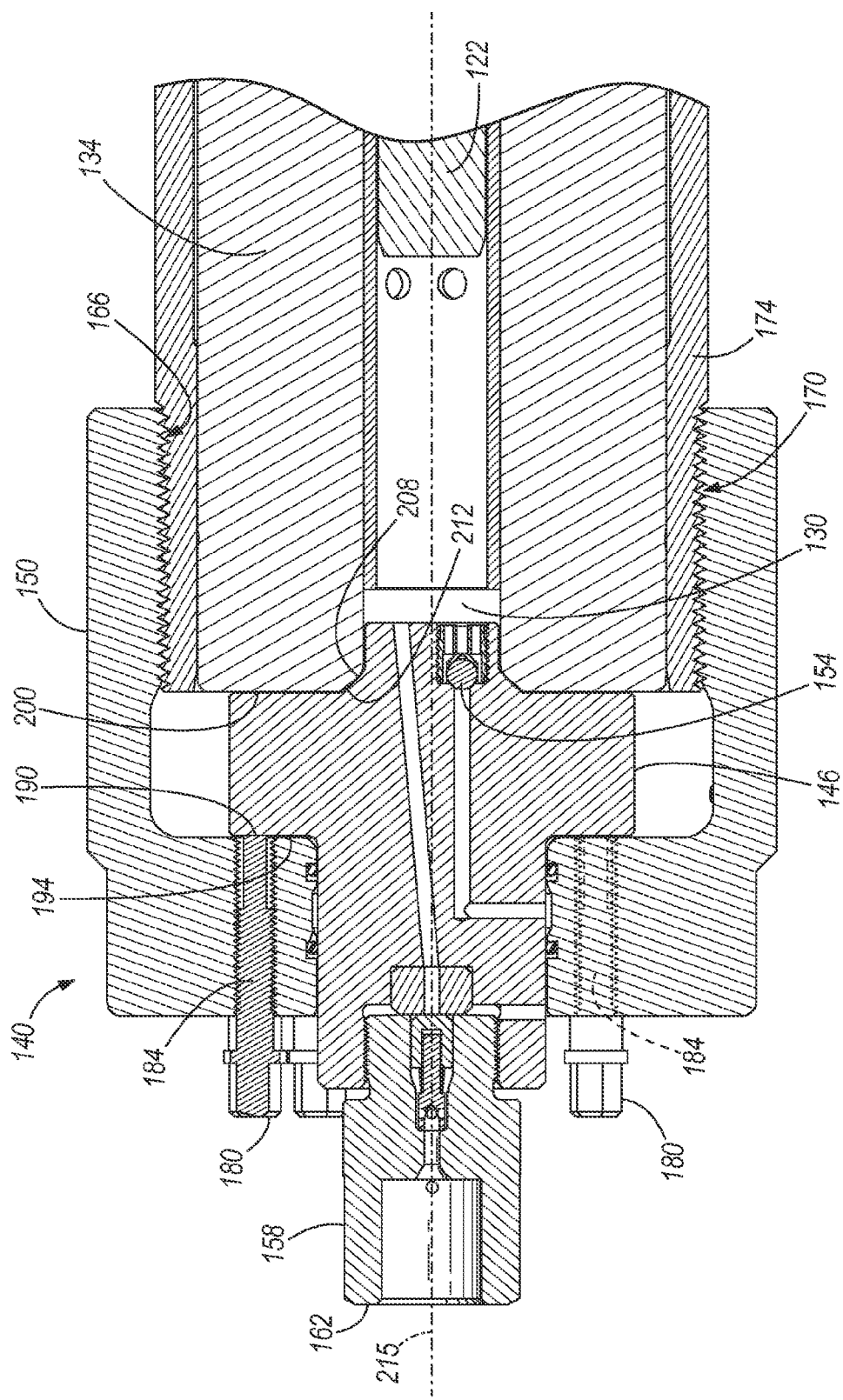
FIG. 4 is a partial cross sectional view of an end portion of the intensifier pump of FIG. 3.

As shown in FIGS. 3 and 4, the seal head assembly 146 includes an inlet check valve 154 configured to allow low pressure water to enter the bore 130 as the plunger 122 is retracted, and an outlet check valve 158 to direct high pressure fluid to the outlet 162 as the plunger 122 advances within the bore 130. Referring to FIG. 4, the end cap 150 in the illustrated embodiment includes female threads 166 for mating with male threads 170 on an outer surface of a hollow stud 174. In other embodiments, the end cap 150 can be secured to the hollow stud 174 with an alternative removable connection. For example, tie rods (not shown) may extend the length of the vessel 134 and couple the hydraulic cylinder head 138 to the end cap 150. A plurality of jack bolts 180 threaded into apertures 184 of the end cap 150 each include end faces 190 that engage the shoulder 194 of the seal head 146 and provide a compressive force to press the seal head 146 into sealing relationship with an end portion 200 of the cylindrical vessel 134. As will be further described below, the seal head 146 includes an engagement face 208 proximate an engagement face 212 of the end portion 200 of the cylindrical vessel 134. The secured cylindrical vessel 134, seal head 146, and end cap 150 are all concentric with a longitudinal axis 215 through the center of the bore 130.

Figure 5:
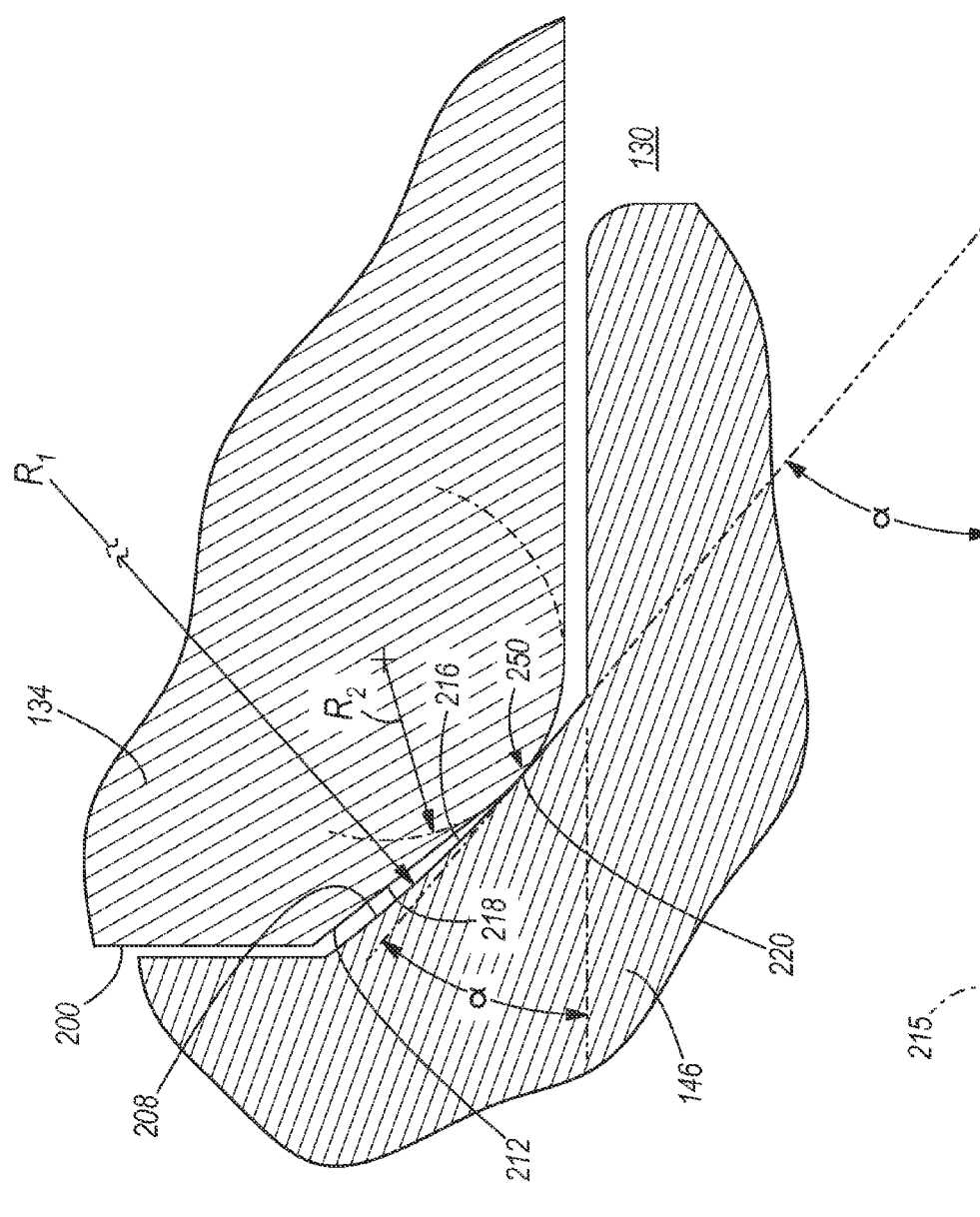
FIG. 5 is a partial cross sectional view of the end portion of FIG. 4, showing a portion of the seal head engaging the cylindrical vessel.

Referring to FIG. 5, the engagement face 208 includes a generally curved contacting surface 216. The curved contacting surface 216 in the illustrated embodiment is concave and has a radius $R_1$ of approximately 0.5" (17.8 mm), with other radii being possible. In the illustrated construction, the surface 216 is defined by a continuous circular curve that extends the full length of the surface 208, with other curves such as ellipses, ovals, variable radius curves and the like also being possible.

The engagement face 212 includes a substantially linear surface 218 and a blend radius 220 formed between the linear surface 218 and the bore 130. Thus, the engagement face 212 is defined in part by the linear surface 218 and the convex blend radius 220. The blend radius 220 has a radius $R_2$ of about 0.08" (2.0 mm) in preferred constructions, with larger and smaller radii being possible.

The engagement of the concave surface 216 and the blend radius 220 provides for a wider seal area than would be achieved if the concave surface 216 were linear. During operation, the cylinder expands radially which can allow the seal head 146 and the concave surface 216 to move inward slightly relative to the blend radius 220. During this cyclic process, the convex blend radius 220 can rock on the surface 216 such that the amount of sliding between the surfaces is reduced. The reduction in sliding can reduce the likelihood of surface damage, thereby improving the life of the components. The engagement of surfaces 216 and 220, when forcibly exerted against each other, exhibits a variable contact angle as they form a pressure-tight seal. The contact angle when the pieces are first mated provides a somewhat shallow contact angle α with respect to the longitudinal axis 215 that allows the seal head 146 to be wedged into the bore 130 of cylinder 134, thus quickly forming a pressure-tight seal with relatively low jack bolt force. As jack bolts 180 are tightened further to exert the proper preload on the joint, the contact angle α changes such that the wedging action on the bore 130 of the cylinder 134 is reduced, which slows the introduction of additional tensile circumferential stresses in the bore, and the contact loading of the seal head 146 on the end of the cylinder 134 becomes more axial.

Figure 6:
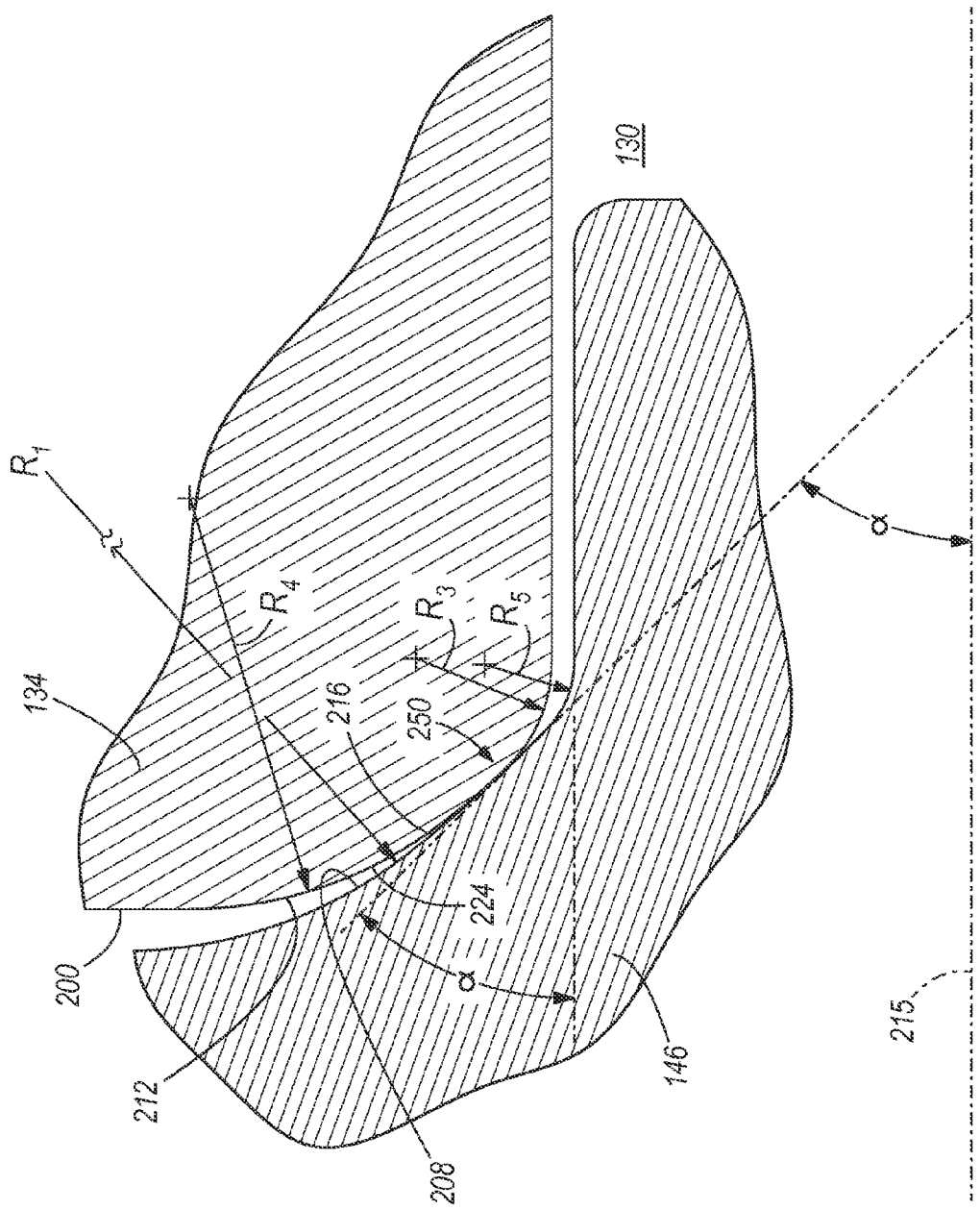
FIG. 6 is a partial cross sectional view of another embodiment of the end portion of FIG. 4, showing a portion of the seal head engaging the cylindrical vessel.

In other constructions, the engagement face 212 includes a convex curved surface 224 that extends along at least a portion of the engagement face 212 and may or may not blend into a linear surface, as shown in FIG. 6. The surface 224 can be defined by a simple curve such as a circle, ellipse, oval, or the like. Alternatively, the surface 224 is defined by a complex curve, which defines a radius that varies as a function of the distance from the longitudinal axis 215. The radius of the surface 224 can vary continuously from a point having a designated radius $R_3$ to another point having a designated radius $R_4$, or can vary non-continuously from $R_3$ to $R_4$. Specifically, the radius of the surface 224 can vary continuously such that an infinite number of radii exist between $R_3$ and $R_4$. Alternatively, the radius of the surface 224 can vary non-continuously such that a discrete number of distinct radii (e.g., one, two, three, etc.) exist between $R_3$ and $R_4$, and in some constructions the surface 224 may be limited to a discrete number of distinct radii linearly connected. In the construction of FIG. 6, the curve radius $R_3$ is smallest near the axis, for example, approximately 0.060" (1.5 mm), and increases as the distance from the axis increases. As illustrated, the radius along the surface 224 smoothly transitions from $R_3$ to a larger radius $R_4$ that ranges from approximately ¼" (6.4 mm) to approximately ⅜" (9.5 mm). In addition, the concave contacting surface 216 in such an embodiment can have a radius $R_1$ ranging from approximately ⅓" (8.5 mm) to approximately ½" (12.7 mm). The concave surface 216 can be similarly arranged such that it can be defined by a simple curve or by a complex curve that can vary continuously or non-continuously from $R_5$ to $R_1$ in the same manner as previously described for $R_3$ and $R_4$.

Figure 7:
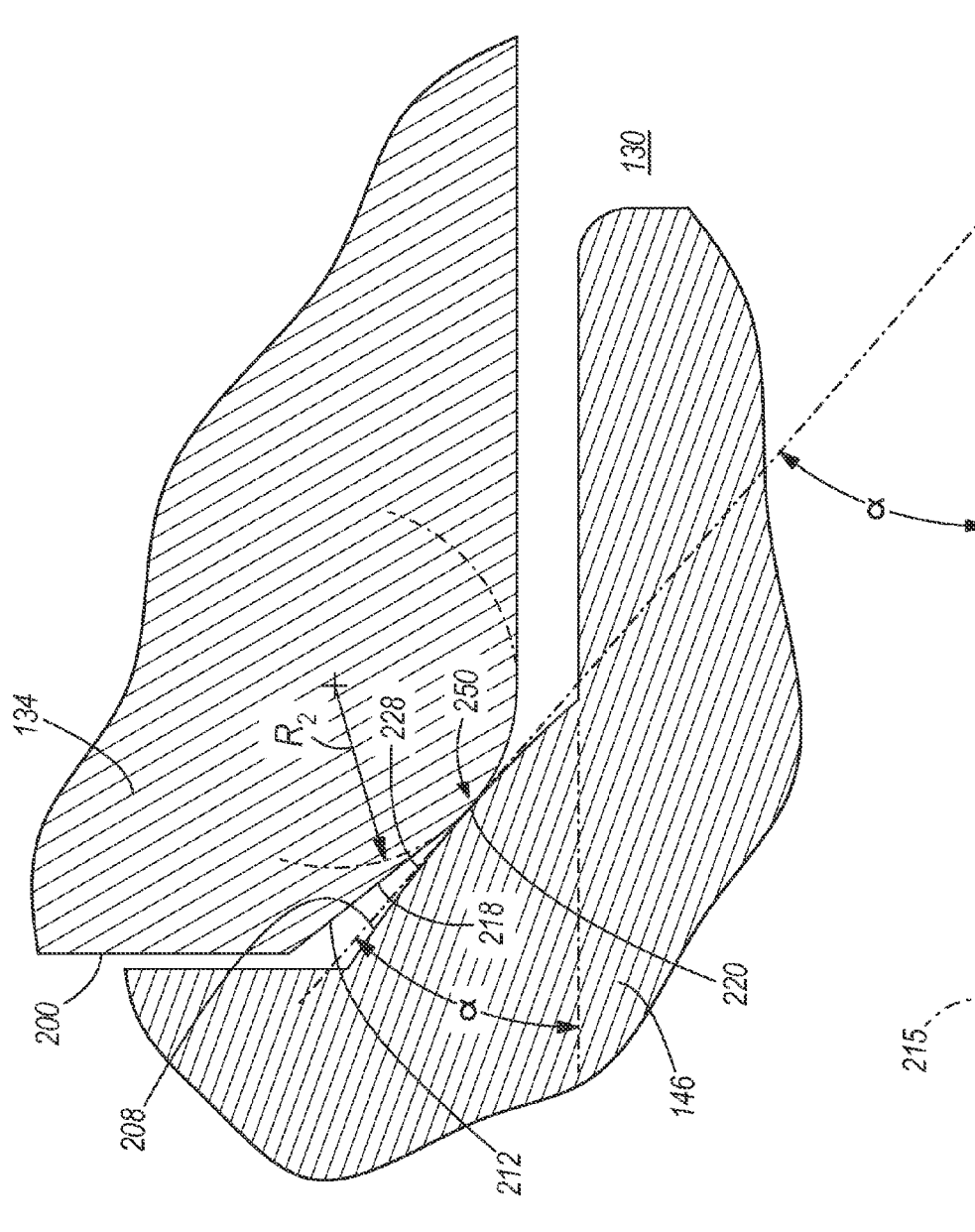
FIG. 7 is a partial cross sectional view of another embodiment of the end portion of FIG. 4, showing a portion of the seal head engaging the cylindrical vessel.

In another embodiment, the engagement face 208 includes a generally convex curved surface 228 that extends the full length of the surface 208. Referring to FIG. 7, the convex curved surface 228 is shown proximate the linear surface 218 and the blend radius 220 of the engagement face 212 of the construction illustrated in FIG. 5. In this construction, the curved surface 228 contacts the blend radius 220 to form a seal therebetween. In alternative constructions, the linear surface 218 and the blend radius 220 are replaced with a convex curved surface, to include any of the aforementioned surfaces 224 of FIG. 6.

The engagement of the convex surface 228 and the blend radius 220 (or curved surface) provides for a narrower seal area than would be achieved if the convex surface 228 were linear. The narrower seal increases the contact pressure per unit of length when compared to other designs. During operation, the cylinder expands radially, which can allow the seal head 146 and the convex surface 228 to move inward slightly relative to the blend radius 220. During this cyclic process, the convex blend radius 220 can rock on the surface 228 such that the amount of sliding between the surfaces is reduced. The reduction in sliding can reduce the likelihood of surface damage, thereby improving the life of the components.

Figure 8:
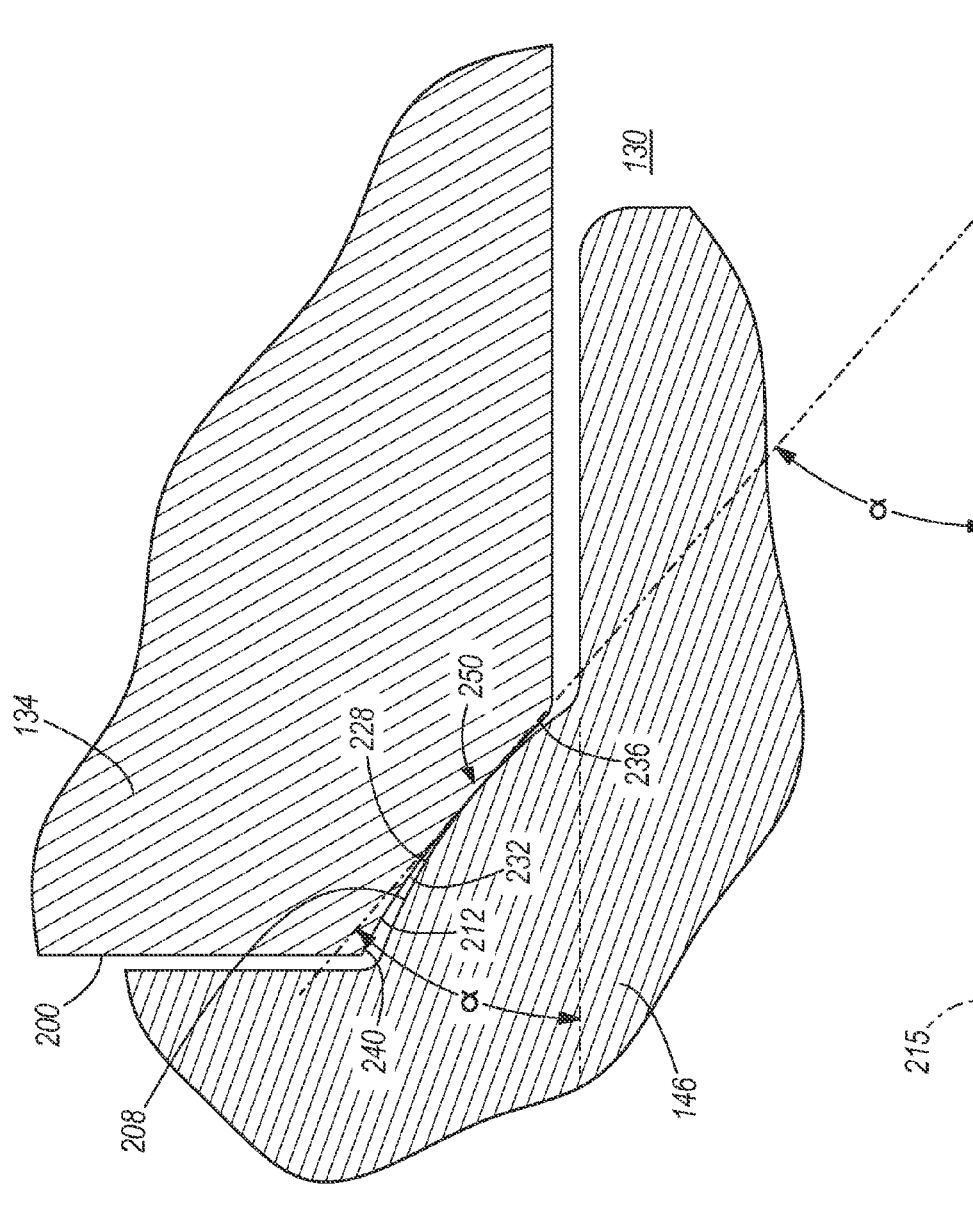
FIG. 8 is a partial cross sectional view of another embodiment of the end portion of FIG. 4, showing a portion of the seal head engaging the cylindrical vessel.

Referring to FIG. 8, another construction includes a seal formed between an engagement face 212 defined by a continuous concave curved surface 232 and the previously identified convex curved surface 228.

Rather than define the surface 232 with a simple curve such as a circle, ellipse, oval, or the like, the surface 232 is defined by a complex curve. Specifically, the complex curve defines a radius that varies as a function of the distance from the longitudinal axis 215. In the illustrated construction, the curve radius is largest near the axis and continuously decreases as the distance from the axis increases. Thus, the radius of the curve at a point 236 of the surface 232 is greater than the radius of the curve at a point 240.

The construction of FIG. 8 provides benefits similar to those described for the construction of FIG. 5. In addition, the use of a variable radius curve or spiral to define the surface 232 improves the sealing of the joint. As the seal head 146 is assembled into the cylinder 134 a wedging action occurs. The wedging action tends to widen the opening at the end of the cylinder and is a function of the contact angle α between the surfaces. As the angle gets smaller, the wedging action increases. However, the arrangement of FIG. 8 is such that as the seal head 146 moves further into the cylinder 134, the contact angle α increases slightly, thereby reducing the wedging action as the forces on the seal head 146 are increased. The reduction in wedging can produce a joint that provides an adequate seal with less force than would be required with another arrangement.

In other constructions, other curves or combinations of curves could be employed to form the surfaces of the engagement faces 208, 212. For example, ovals, ellipses, other conic sections, etc. could be used alone or in combination to define the engagement faces 208, 212. In still other constructions, other complicated or compound curves could be employed for the surfaces of the engagement faces 208, 212. It should also be noted that the examples illustrated herein could be combined or changed such that aspects of one illustrated construction could be applied to other constructions illustrated or described herein.

When urged together by the fastening of the end cap 150 to the hollow stud 174 and the action of the jack bolts 180, the aforementioned surfaces of the engagement faces 208, 212 illustrated in FIGS. 5-8 engage each other at a point of contact 250, the tangent line to which forms a contact angle α with respect to the longitudinal axis 215 (also illustrated locally to the point of contact 250 in FIGS. 5-8). In some constructions, the contact angle α ranges from approximately 30° to approximately 60°. In one construction, the contact angle α can be about 37°. In another construction, the contact angle α can be about 45°. In still another construction, the contact angle α can be about 55°.

In operation, the end cap 150 is fastened to the hollow stud 174 to properly align and provide a first amount of compressive force between the seal head 146 and the end portion 200 of the cylindrical vessel 134. In the case of the construction of FIGS. 3 and 4, the end cap 150 is fastened to the hollow stud 174 which is anchored in the hydraulic cylinder head 138. The jack bolts 180 are rotated to engage the end faces 190 with the shoulder 194 of the seal head assembly 146 until a desired final amount of compressive force is obtained. When the jack bolts 180 are rotated, the hollow stud 174 is placed in tension and the cylindrical vessel 134 is placed in compression due to the axial load. During rotation of the jack bolts 180, the end faces 190 push the seal head 146 and the engagement faces 208, 212 together. The engagement faces 208, 212 interface at the point of contact 250 as previously described to form a seal that inhibits unwanted flow leakage from the bore 130 throughout the operational pressure fluctuations of the pumping cycle. In other designs, the hollow stud 174 and the cylindrical vessel 134 are combined into one piece and another tensioning method such as tie rods are employed to provide the necessary compression between the cylindrical vessel 134 and the seal head 146. In still another design, the end cap 150 is fastened directly to the cylindrical vessel 134 using mating female and male threads, without the need for the hollow stud 174.

It has been unexpectedly determined that the seal engagement configurations illustrated and described result in a more effective seal between the seal head 146 and the cylindrical vessel 134 than identified in previous engagement configurations having alternative geometries. As an example, the point of contact 250 of the configurations of FIGS. 5-8 is in closer proximity to the longitudinal axis 215 than in previous configurations. The high pressure fluid being sealed therefore acts on a smaller surface area of the seal head 146, resulting in a lower force tending to separate the seal head from the cylinder 134. For this and other reasons, the engagement of the seal head 146 and the cylindrical vessel 134, as illustrated in any of FIGS. 5-8 and further described herein, has been found to provide a satisfactory seal connection at a lower required value of compressive force while concurrently reducing the incidence of galling and spalling between the contacting surfaces. The reduced galling and spalling increases the re-sealability of the components, thereby increasing the life of the components.

In all of the aforementioned embodiments, it is to be understood that all operational sealing contact of the cylinder 134 with the seal head 146 occurs between two curved surfaces, as described herein.

Various features and advantages of the invention are set forth in the following claims.

I claim:

1. A sealing system for a high pressure pump, the pump having a vessel defining a vessel bore and having an end portion, the vessel bore having a first engagement face and defining a central longitudinal axis, the pump further including a plunger cooperative with the vessel to increase the pressure of a fluid within the bore, the sealing system comprising:
   a seal member at least partially received within the bore and defining a second engagement face; and
   a retaining member in operative contact with the seal member to mate the first engagement face with the second engagement face to inhibit fluid leakage from the bore, wherein the first engagement face includes a first contacting surface having a non-linear cross-section that is convex or concave, and wherein the second engagement face includes a second contacting surface having a non-linear cross-section that is the other of convex or concave in contact with the first contacting surface, wherein the non-linear cross-section of the first contacting surface is concave and the non-linear cross-section of the second contacting surface is convex, and wherein the non-linear cross-section of the second contacting surface includes a first radius and a second radius different from the first radius, and wherein the radius of the non-linear cross-section of the second contacting surface between the first radius and the second radius is continuously variable.

2. The sealing system of claim 1, wherein the first radius is disposed nearer the longitudinal axis than the second radius, and further wherein the first radius is smaller than the second radius.

3. The sealing system of claim 1, wherein the first contacting surface and the second contacting surface contact at an initial contact point and wherein a tangent of the first contacting surface at the initial contact point is angled between 30 degrees and 60 degrees with respect to the longitudinal axis.

4. A sealing system for a high pressure pump, the pump having a vessel defining a vessel bore and having an end portion, the vessel bore having a first engagement face and defining a central longitudinal axis, the pump further including a plunger cooperative with the vessel to increase the pressure of a fluid within the bore, the sealing system comprising:
  a seal member at least partially received within the bore and defining a second engagement face; and
  a retaining member in operative contact with the seal member to mate the first engagement face with the second engagement face to inhibit fluid leakage from the bore, wherein the first engagement face includes a first contacting surface having a non-linear cross-section that is convex or concave, and wherein the second engagement face includes a second contacting surface having a non-linear cross-section that is the other of convex or concave in contact with the first contacting surface, wherein the non-linear cross-section of the first contacting surface is concave and the non-linear cross-section of the second contacting surface is convex, and wherein the non-linear cross-section of the first contacting surface includes an innermost portion having a first radius and an outermost portion having a second radius different from the first radius, and wherein the radius between the innermost portion and the outermost portion is continuously variable between the first radius and the second radius.

5. A high pressure pumping system for fluid in excess of 15,000 psi, the pumping system defining a longitudinal axis and comprising:
  a first component including a first engagement face having a first contacting surface with a first non-linear cross-section that is convex;
  a second component including a second engagement face having a second contacting surface with a second non-linear cross section that is concave; and
  a retaining member coupled to one of the first component and the second component to sealingly connect the first engagement face to the second engagement face to inhibit fluid leakage therebetween,
  wherein the first non-linear cross-section includes an innermost portion having a first radius and an outermost portion having a second radius different from the first radius, and wherein the radius between the innermost portion and the outermost portion is continuously variable between the first radius and the second radius.

6. The pumping system of claim 5, wherein the first radius is smaller than the second radius.

7. The pumping system of claim 5, wherein the second non-linear cross-section includes a first concave cross-section at an innermost portion of the second contacting surface having a third radius and a second concave cross-section adjacent the first concave cross-section and having a fourth radius that is different than the third radius.

8. The pumping system of claim 7, wherein the third radius is smaller than the fourth radius.

9. The pumping system of claim 5, wherein the second non-linear cross-section includes an innermost portion having a third radius and an outermost portion having a fourth radius different from the third radius, and wherein the radius between the innermost portion and the outermost portion is continuously variable between the third radius and the fourth radius.

10. The pumping system of claim 5, wherein the first engagement face and the second engagement face contact at an initial contact point and wherein a tangent of the first engagement face at the initial contact point between 30 degrees and 60 degrees with respect to the longitudinal axis.

11. The pumping system of claim 5, wherein the first component includes a longitudinal bore sized to receive a plunger.

12. A high pressure pump for producing fluid pressure in excess of 15,000 psi, the pump comprising:
  a vessel including an end portion having a first engagement face, the vessel including a vessel bore that defines a central longitudinal axis and is in communication with a source of fluid;
  a plunger cooperative with the vessel to increase the pressure of a fluid within the bore;
  a seal member at least partially received within the bore and defining a second engagement face; and
  a retaining member in operative contact with the seal member and with the vessel to mate the first engagement face with the second engagement face to inhibit fluid leakage from the bore, wherein the first engagement face includes a convex contacting surface with a variable radius continuously increasing with increasing distance from the longitudinal axis.

13. The high pressure pump of claim 12, wherein the convex contacting surface includes a first convex cross-section having a first radius and a second convex cross-section adjacent the first convex cross-section and having a second radius that is different than the first radius, wherein the first radius is smaller than the second radius.

14. The high pressure pump of claim 12, wherein the second engagement face includes a concave contacting surface with a variable radius continuously increasing with increasing distance from the longitudinal axis, and wherein the concave contacting surface includes a first concave cross-section having a third radius and a second concave cross-section adjacent the first concave cross-section and having a fourth radius that is different than the third radius.

15. The high pressure pump of claim 14, wherein the third radius is smaller than the fourth radius.

16. The high pressure pump of claim 14, wherein the first engagement face and the second engagement face contact at an initial contact point and wherein a tangent of the first engagement face at the initial contact point between 30 degrees and 60 with respect to the longitudinal axis.

17. The high pressure pump of claim 14, wherein the first engagement face and the second engagement face contact at an initial contact point and wherein a tangent of the first engagement face at the initial contact point is angled at 55 degrees with respect to the longitudinal axis.

* * * * *